United States Patent

Loyzim

[15] 3,665,284
[45] May 23, 1972

[54] POWER SUPPLY FOR A STEPPING MOTOR DEPENDENT UPON VOLTAGE LEVEL AND PULSING RATE

[72] Inventor: Robert J. Loyzim, Coventry, Conn.
[73] Assignee: The Superior Electric Company, Bristol, Conn.
[22] Filed: July 20, 1970
[21] Appl. No.: 56,526

[52] U.S. Cl. ............................................. 318/696, 318/442
[51] Int. Cl. ..................................................... H02k 37/00
[58] Field of Search .............. 310/49; 318/696, 68, 254, 138, 318/439, 440, 441, 442

[56] References Cited

UNITED STATES PATENTS

| | | | |
|---|---|---|---|
| 3,355,646 | 11/1967 | Goto | 310/49 X |
| 3,505,579 | 4/1970 | Leenhouts et al. | 318/440 |
| 3,437,899 | 4/1969 | Hirokawa | 318/696 |
| 3,452,263 | 6/1969 | Newell | 318/138 |

Primary Examiner—G. R. Simmons
Attorney—Johnson & Kline

[57] ABSTRACT

A power circuit for supplying power from an A.C. source to a D.C. energized variable speed stepping motor to increase the torque at high speeds and the maximum stepping speed of the motor with the speed of the motor being regulated by a control circuit to be independent of the voltage supplied thereto, by adjusting the value of the voltage from the A.C. source to the motor substantially inversely to the value of the current drawn by the motor during a relatively low range of speeds and by providing a substantially constant voltage of a higher value at high stepping speeds with the high constant voltage source being made operative from information that both the motor speed is above a predetermined value and the motor voltage exceeds a predetermined value.

6 Claims, 4 Drawing Figures

Patented May 23, 1972

INVENTOR.
Robert J. Loyzim
BY
Johnson and Kline
ATTORNEYS

INVENTOR.
Robert J. Loyzim
BY
Johnson and Kline
ATTORNEYS

ND UPON VOLTAGE LEVEL AND PULSING RATE

In U.S. Pat. No. 3,505,579 assigned to the assignee of the present invention there is disclosed a circuit for supplying power to a stepping motor. The motor has stator windings and, when some of the windings having their energization changed, the motor will produce a small increment of movement of its rotor. By changing in a particular sequence the windings which are energized, the motor may be made to rotate at a speed determined solely by the frequency of the changes of energization. Thus by varying the frequency of the changes of energization, the speed of the motor may be varied and also by maintaining an energization, without change, the rotor may be held stationary.

It had been found that in order to effectively utilized the motor over a wide speed range with a useful torque output that the voltage across the motor should be varied as its speed is varied in order to compensate for the motor's impedance increasing with speed. If the voltage remained constant at a low value, it was found that the torque of the motor decreased at higher speeds, while if the voltage was high, too high a value of current flowed at the stationary condition and harmed the motor.

The above-noted patent discloses and claims a power source for such a stepping motor in which over an intermediate range of speed, the voltage across the motor is varied directly with the speed, such that as the speed increased, the voltage increased and thus provided sufficient voltage to force a current flow which produced a substantial torque at speeds up to about 1,000 steps per second. Moreover, the power circuit disclosed had a constant voltage source which became effective at low stepping speeds of the motor to prevent the variable power source from decreasing the motor voltage below a predetermined level.

While the above-noted system has been found extremely satisfactory, attempts to use the system with stepping motors that are operated up to and including 3,000 to 5,000 steps per second have not proven successful in either or both operating at this speed and having a useable torque.

It is accordingly an object of the present invention to provide a power supply for a stepping motor which is capable of operating the motor over a wider speed range than heretofore possible while maintaining a substantially useable torque throughout the speed range.

Another object of the present invention is to achieve the above object with a power supply that essentially uses the components heretofore employed without any substantial change therein.

A further object of the present invention is to provide a power supply for a stepping motor which is composed of extremely simple and reliable components that not only have a long life but also may be economically associated with a control circuit with few, if any, alterations of the control circuit.

In carrying out the present invention, a power supply for a stepping motor is utilized with a control circuit and stepping motor as disclosed, for example, in U.S. Pat. No. 3,117,268 also assigned to the assignee of the present invention. Also, the power supply includes the circuit for providing a variable voltage to the motor over its intermediate speed range as disclosed in the other above-noted patent.

In accordance with the present invention, there is added a constant voltage circuit which provides a constant voltage to the motor which is higher in valve than the voltage that may be supplied by the variable voltage power circuit. The higher voltage circuit becomes automatically effective in both embodiments of the invention whenever there simultaneously occurs a value of voltage from the variable power circuit above a selected level and also a speed of the motor above a selected level. By limiting usage of the higher voltage circuit by these two conditions, there is prevented from being applied to the motor, a voltage which could cause a current flow which could be of a value that would be harmful to the motor.

In another embodiment of the invention, the variable power circuit is used for a low range of stepping speeds and the high constant voltage circuit also becomes operative only when both the variable power circuit supplies a value of voltage above a preselected value and when the stepping speed exceeds a certain rate. This latter circuit is particularly advantageous when the motor operates either at variable speeds within a relatively narrow low speed range or at a high speed with no planned operation for speeds in between. Thus the variable power circuit may be adjusted to effect the most efficient operation of the motor for low speeds while, when a higher voltage is needed for high speed, the constant high voltage circuit becomes operative.

Other features and advantages will hereinafter appear.

Figure 1:
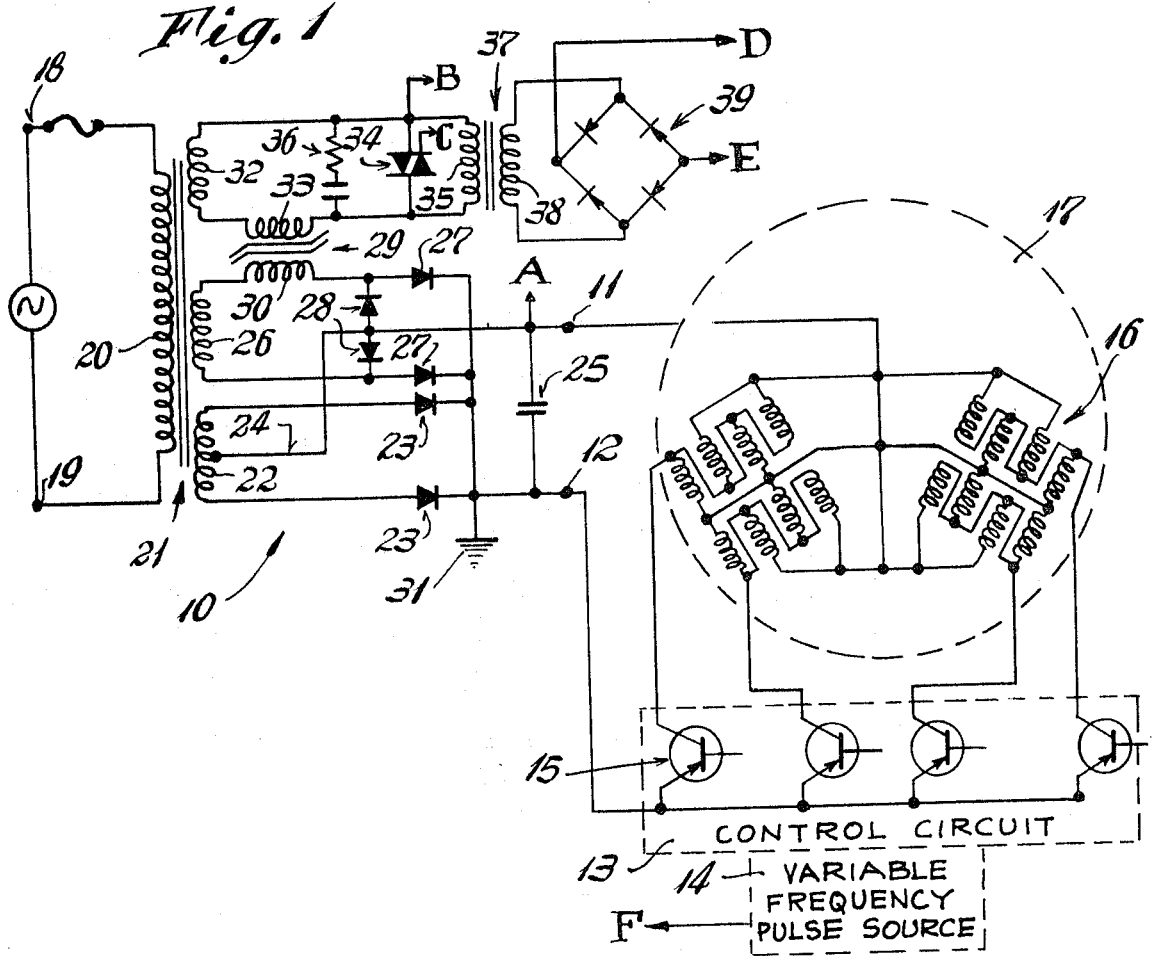
FIG. 1 is an electrical schematic diagram of the components of the power supply for a stepping motor of the present invention.

Referring to the drawing, the embodiment of the power supply for a stepping motor shown in FIG. 1 is generally indicated by the reference numeral 10 and is shown having a pair of output terminals 11 and 12 that are connected to a control circuit 13. The control circuit 13 accepts pulses from a variable frequency pulse source 14 and through transistors 15 energizes windings 16 of a stepping motor 17. The electric power to the motor windings 16 is obtained from the power supply 10 and its distribution among the windings is controlled by the transistors 15. In a four step sequence, there are two transistors conducting at a time and each incremental step is produced by a change of energization of the motor windings caused by changing the pair of transistors that are conducting. The motor will have a speed determined solely by the frequency of the changes in energization with the control circuit causing a change in energization for each pulse receiver from the pulse source 14 substantially instantaneously with receipt of the pulse so that the pulse source is the speed of the motor.

The power supply 10 has a pair of input terminals 18 and 19 connectible to a source of alternating current and to the primary winding 20 of a transformer 21. A center tapped secondary winding 22 has its ends connected to the output terminal 12 through diodes 23 while the center tap is connected by a lead 24 to the terminal 11. A condenser 25 is connected for smoothing across the terminals 11 and 12. The winding 22 and its associated components supplies to the terminals 11 and 12 a constant value of D.C. voltage that is relatively low and constitutes the minimum voltage which the power supply applies to the motor.

For supplying a voltage that varies with the impedance of the motor windings during the intermediate speed range, there is provided another secondary winding 26 having its ends connected through diodes 27 to the terminal 12 and through diodes 28 to the terminal 11. An inductor means 29 has one winding 30 connected in series with the secondary winding 26. It will be noted that the terminal 12 though grounded as at 31 is positive with respect to the terminal 11.

The above-described components of the power supply are described in the above-noted U.S. Pat. No. 3,505,579. It will be understood that the secondary winding 22 provides a constant D.C. voltage to the motor while the secondary winding 26 together with inductor winding 30 provides a variable D.C. voltage which increases in value as the speed of the motor increases. For a more complete description of the operation of these circuits, reference is made to the above-noted patent.

The transformer 21 includes a further secondary winding 32 that is connected in series with a winding 33 of the inductor means 29 and with a parallel circuit consisting of a reversible conducting semiconductor 34 and a transformer winding 35.

A spike surpressing circuit 36 protects the semiconductor 34. The winding 35 is part of a transformer 37 that has a secondary winding 38 connected to a full wave rectifier 39 for supplying rectified A.C. to terminals D and E.

When it is desired to provide a higher voltage to the motor than that which the variable power circuit which includes the components 26 and 30 is capable of providing, the semiconductor 34 is caused to be conducting to provide a voltage across the winding 33.

Figure 2:
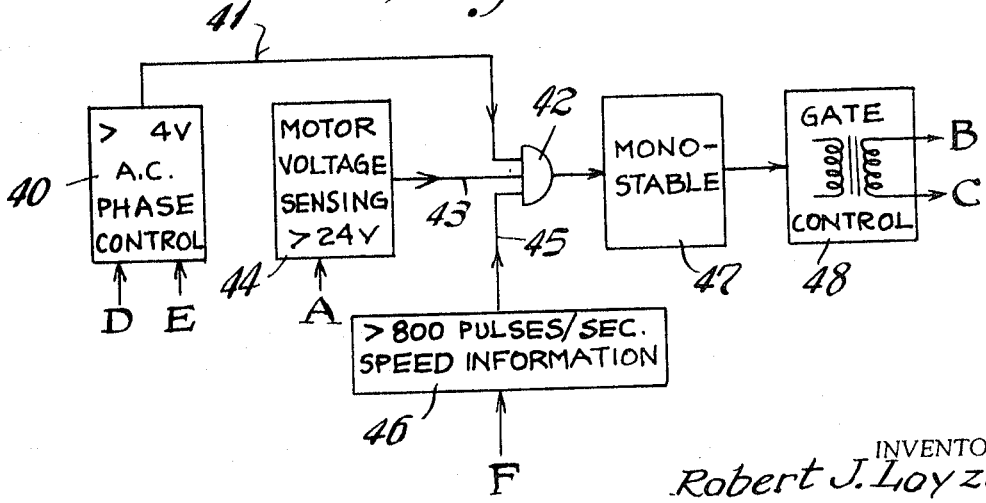
FIG. 2 is a block and diagrammatic diagram of the control circuitry used in the power supply to effect shifting from the variable power circuit to the high voltage power circuit.

For controlling the conduction of the semiconductor 34, reference is made to the block diagram, FIG. 2, which has terminals B and C that provide a gating pulse to the terminals B and C of the semiconductor 34 and cause it to be conducting for the remainder of each half cycle of A.C. in which the gating pulse is provided. The gating pulse is applied for each half cycle shortly after the half cycle has begun and for controlling the phase relationship between the gating pulse and the A.C. input power, the terminals D and E are connected as inputs to a phase control circuit 40 which supplies on a lead 41 a signal whenever the voltage across the semiconductor 34 exceeds 4 volts which occurs shortly after the beginning of every half cycle.

The lead 41 is connected to one input of a three input AND gate 42 which has another input connected by a lead 43 to a motor voltage sensing circuit 44. This circuit senses the voltage at a point A, which is the terminal 11, and provides a signal to the AND gate 42 whenever the motor voltage is exceeding a selected value, herein indicated as being 24 volts. The third input to the AND gate 42 is on a lead 45 that is connected to be the output from a speed information circuit 46 which receives pulses on a lead F from the variable frequency source 14 and produces a signal whenever the frequency of the pulse source 14 exceeds a selected frequency, herein specifically indicated as 800 pulses per second. Accordingly, whenever the AND gate 42 receives signals on all three leads 41, 43 and 45, it produces an output to a monostable circuit 47 which in turn provides to a gate control 48, the power to supply a gating pulse to the semiconductor 34.

In the operation of the above circuit, the low voltage circuit that includes the winding 22 is continually operative to provide a minimum value of D.C. voltage to the motor. The variable voltage circuit that includes the winding 26 and the winding 30 has the value of its components selected such that the voltage applied to the motor 17 as controlled by the impedance of its windings, is reduced by the inductor means 29 below the voltage supplied by the low voltage circuit for stepping speeds normally less than 100 steps per second. Upon the motor having its speed increased to more than 100 steps per second, the impedance of its windings increases which decreases the flow of current through the motor and also through the inductor means 29 which in turn reduces the voltage drop caused by the inductor means 29 and causes an increase in the voltage to the motor. As the motor's speed increases, its impedance will continue to increase and the current drawn will decrease, which decreases the voltage drop by the inductor means 29 and causes a higher voltage to be applied across the motor and control circuit.

It has been found that the inductor circuit, while satisfactorily varying the voltage over a relatively large speed range, is incapable of also controlling the voltage for quite high speeds on the order of 3,000 to 5,000 steps per second. Accordingly, the present power supply provides for supplying to the motor, a constant value of high voltage whenever the motor speed exceeds a preselected speed and also when the inductor circuit is supplying a preselected voltage. Specifically, as shown in FIG. 2, the constant value of high voltage is applied whenever the inductor circuit produces a motor voltage that is greater than 24 volts and the pulse source 14 is operating the motor at a speed greater than 800 steps per second. When both of these conditions occur, the semiconductor 34 receives a gating signal from the gate control 48 and is rendered conducting which causes current to flow in the circuit that includes the winding 32, the inductor winding 33 and the semiconductor 34 for each half cycle of alternating current.

The current flow in the winding 33 causes the inductor means 29 to function as a transformer, specifically a boost transformer and there is thus added to the inductor circuit the voltage caused by this current flow, so that the voltage appearing at the diodes 27 and 28 will be the sum of the voltage produced by the winding 26 and the sum of the boost voltage provided by the winding 30. In one embodiment of the invention the winding 26 produced about 30 volts as a maximum and the boost voltage derived from the winding 33 approximated 10 volts so that the high voltage constant value approximated 40 volts.

Figure 3:
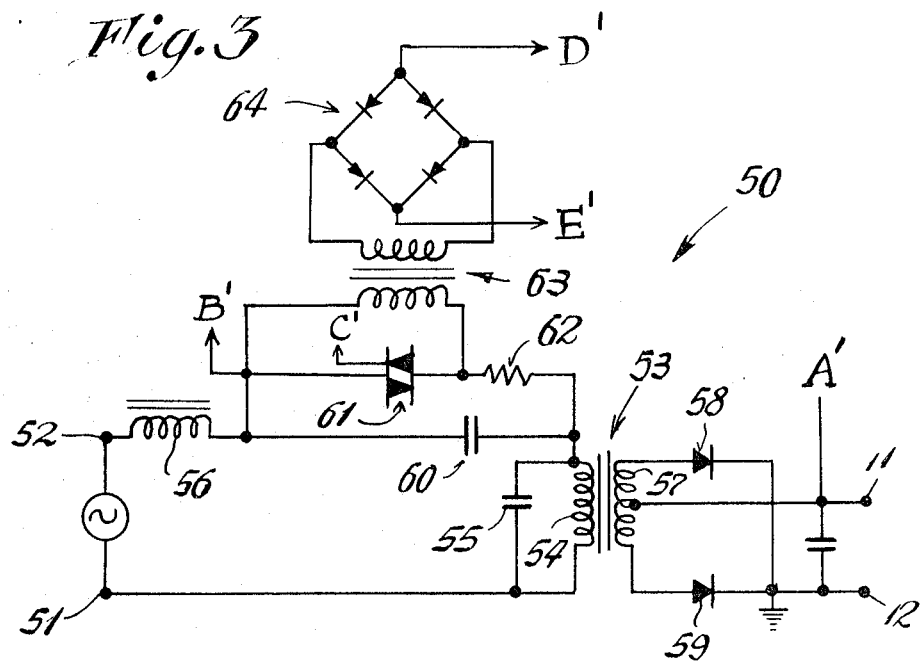
FIG. 3 is a view similar to FIG. 1 of a further embodiment of the present invention useable when the motor is operated either in a variable low speed range or at a high speed.

Shown in FIG. 3 is a further embodiment of the present invention which is especially useful when the motor is operated either in a relatively low speed range or at a high constant speed. This present circuit utilizes the variable power supply for the low range which may be on the order of up to 300 steps per second while the high speed is at a rate of about 5,000 steps per second.

The circuit is generally indicated by the reference numeral 50 and includes terminals 51 and 52 connected to a source of A.C. with a transformer 53 having a winding 54 connected across the source. A condenser 55 parallels the winding 54 while an inductor 56 is placed in series with the winding. Also included in the circuit is a secondary winding 57 which through rectifiers 58 and 59 produces a voltage on the terminals 11 and 12 to the motor 17 and control circuit 13. Connected between the inductor 56 and winding 54 is a condenser 60 which is by-passed by a circuit that includes a reversibly conducting semiconductor 61 and a resistance 62. A transformer 63 has a primary winding connected across the semiconductor 61 and a secondary winding connected to a full wave rectifying bridge 64 having an output appearing on leads D' and E'.

Figure 4:
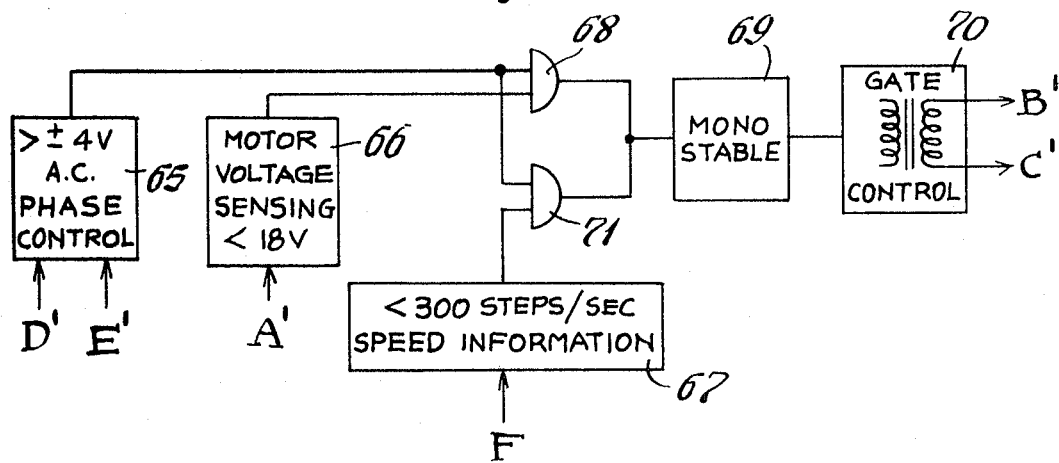
FIG. 4 is a view similar to FIG. 2 of the control circuit for the embodiment shown in FIG. 3.

During operation of the motor and motor control in the low speed range, the semiconductor 61 is caused to be conducting, bypassing the condenser 60 and the circuit functions in essentially the same way as described in the above-noted patent (–579) with the inductor varying the voltage to the motor with speed. For causing conduction of the semiconductor 61 during each half cycle a gating pulse supplying circuit (FIG. 4) is provided and includes an A.C. phase control 65 having inputs from leads D' and E', a motor voltage sensing circuit 66 having an input from the point A' (terminal 11) and a speed information circuit 67 having an input F obtained from the variable frequency pulse source 14. Connected to a first AND gate 68 are the outputs from the phase control circuit 65 and the motor voltage sensing circuit 66 so that the AND gate 68 produces a signal whenever the voltage at the terminal 11 is less than 18 volts. This AND gate signal is supplied to a monostable 69 which through a gate pulse circuit 70 effects the gating signals to the semiconductor 61.

This embodiment also effects shifting from one motor voltage when both the motor voltage has attained a selected value and the speed has a selected value by the use of another AND gate 71 having its inputs connected to the circuits 65 and 67 and producing a signal to the monostable 69 whenever the motor speed is less than 300 steps per second. Thus, the semiconductor 61 will be caused to be conducting for each half cycle whenever either the motor voltage is less than 18 volts or the motor speed is less than 300 steps per second.

When neither one of these two conditions occur, gating pulses will not be supplied to the semiconductor 61 and it will be in effect open circuited placing the condenser 60 in series with the inductor 56. The condenser 60 and inductor 56 form a series resonant circuit which renders the inductor 56 incapable of changing the voltage with changes in current and thus produces at the terminals 11 and 12 a relatively constant voltage of approximately 42 volts. The embodiment of the circuit shown in FIGS. 3 and 4 has especial utility when used with a numerical control system that operates a machine tool such as a milling machine where only two speed ranges are required, a low speed range for milling and a high speed for positioning with the motor accelerating rapidly from the low speed range to its high speed.

The selected levels of motor voltage and speed which cause the power supply to apply a high constant voltage to the motor may be altered to suit different motors and/or applications and the specific levels recited herein are to be considered only as exemplary and not as limitations on the scope of the invention.

In both embodiments of the invention it will be understood that the variable power circuit varies the motor voltage by reason of the current drawn by the motor, thus the voltage is controlled by the current. On the other hand, the high speed voltage circuits are basically independent of the amount of current flowing and will maintain a constant voltage to the motor with variations in current. This enables, even for only the small increase in voltage from 28 to 40 V in the first embodiment, to increase the maximum power to the motor by about three times the maximum power which the variable voltage circuit should produce. Accordingly, with three times the power the motor may deliver 3 times the torque at the same speed or the same torque at 3 times the speed. Typical examples of the variable voltage circuit are output values of 300 in.-oz. at 1,000 steps/sec. while the same motor using the high voltage constant voltage circuit has an output of 300 in.-oz. at 3,000 steps/sec.

It will accordingly be appreciated that there has been disclosed a power supply for a stepping motor which enables the stepping motor to be operated at higher speeds with greater torque than that which it has been capable when used with heretofore known power supplies. This is achieved by providing in both embodiments a variable voltage circuit which supplies the power to the motor when it is operated at a selected speed range, either a low range or an intermediate range and which varies the voltage to the motor as the motor impedance changes. The power supply also provides to the motor, a constant high value of voltage for use when the motor is operated at a high speed and has a value which is capable of forcing substantial current through the motor to produce a substantial useable torque. The shifting from the variable voltage to the high voltage circuit and the maintaining of the high voltage circuit is made in both embodiments to be automatically responsive to both a preselected value of the voltage provided by the variable voltage circuit and simultaneously a preselected motor speed.

Variations and modifications may be made within the scope of the claims and portions of the improvements may be used without others.

I claim:

1. In combination with a digital stepping motor of the type having stator windings that produce an incremental movement for each change of energization of at least some of the windings by unidirectional current, a control circuit having an output connected to the windings to provide a change of energization upon receipt of a command pulse, command pulse supplying means for providing command pulses at a rate that determines the operating speed of the motor with the rate being variable from none to a relatively high value, power means having output terminals connected to the control circuit to provide the unidirectional output power that the control circuit supplies to the stator windings and a first power circuit in the power means having means for providing a voltage to the output terminals of the power means that varies substantially inversely with the value of current flow through the windings, the improvement comprising a second power circuit in the power means for providing a substantially constant value of voltage to the output terminals and means for activating said second power circuit only when a selected value of voltage is produced by the first power circuit, said constant voltage being of a higher value then said selected value and simultaneously therewith when the rate of the command pulses exceeds a preselected value.

2. The invention as defined in claim 1 in which the rate of the command pulses to the motor has a high rate range and a lower rate range and in which the second power circuit is only operated at the high rate range of the command pulses.

3. The invention as defined in claim 1 in which the power means includes a third power circuit for providing a constant value of voltage to the motor, said voltage being the minimum value of voltage applied to the motor by the power means.

4. In combination with a digital stepping motor of the type having stator windings that produce an incremental movement for each change of energization of at least some of the windings by unidirectional current, a control circuit having an output connected to the windings to provide a change of energization upon receipt of a command pulse, command pulse supplying means for providing command pulses at a rate that determines the operating speed of the motor with the rate being variable from none to a relatively high value, power means having output terminals connected to the control circuit to provide the unidirectional output power that the control circuit supplies to the stator windings and a first power circuit in the power means having means for providing a voltage to the output terminals of the power means that varies substantially inversely with the value of current flow through the windings, the improvement comprising a second power circuit in the power means for providing a substantially constant value of voltage to the output terminals and means for activating said second power circuit when a selected value of voltage is produced by the first power circuit, said constant voltage being of a higher value then said selected value, in which the power means has input terminals connectible to an A.C. source, and rectifying means, the first power circuit includes an inductance means connected between the input terminals and the rectifying means for varying the voltage from the power means and in which there are means effective upon the actuation of the second power circuit to nullify the effect of the inductance means to vary the voltage.

5. The invention as defined in claim 4 in which the nullifying means includes a condenser connected between the input terminals and the rectifying means for forming a series resonant circuit with the inductance means.

6. The invention as defined in claim 4 in which nullifying means includes a winding in the inductance means and in which the second power circuit when actuated provides a voltage to the winding to transform the inductance means into a transformer to provide a boosting voltage.

* * * * *